United States Patent [19]

Varga

[11] 4,108,043

[45] Aug. 22, 1978

[54] ANCHORAGE APPLIANCE

[75] Inventor: Otto Herman Varga, Bradford-on-Avon, England

[73] Assignee: Resilient Grip Limited, Bristol, England

[21] Appl. No.: 811,126

[22] Filed: Jun. 28, 1977

[30] Foreign Application Priority Data

Aug. 2, 1976 [GB] United Kingdom ............... 32043/76

[51] Int. Cl.² ............................................. F16B 13/06
[52] U.S. Cl. ........................................................ 85/70
[58] Field of Search ................... 85/70, 71, 1 R, 50 R, 85/62, 64, 67, 73; 151/2 R, 70

[56] References Cited

FOREIGN PATENT DOCUMENTS

| 519,317 | 5/1953 | Belgium ........................................ 85/70 |
| 189,899 | 6/1956 | Fed. Rep. of Germany ............... 85/70 |
| 774,002 | 5/1957 | United Kingdom ........................ 85/70 |
| 907,899 | 10/1962 | United Kingdom ........................ 85/70 |

*Primary Examiner*—James T. McCall

*Attorney, Agent, or Firm*—Shoemaker and Mattare, Ltd.

[57] ABSTRACT

An anchorage appliance comprising a bolt having a head and a threaded stem, a nut on said stem, a metal sleeve permanently associated with the nut and encircling the stem, an annular body of elastomeric material, for example rubber, mounted on the sleeve, a metal collar telescoping over the sleeve. The elastomeric body is subjectible to axial compressive force between annular abutment surfaces on the nut and on the collar when the nut moves up the threaded stem towards the bolt head. The nut, the collar and the elastomeric body when unstressed together have external cylindrical surfaces of similar diameter except that the elastomeric body is formed integrally with at least one narrow outwardly projecting annular flexible flange. The flange has an overall diameter which is 7 to 15% larger than that of the collar, the nut and the elastomeric sleeve when the latter is in unstressed condition, all whereby the appliance can be satisfactorily used when inserted in a preformed hole having a diameter up to 10% greater than the diameter of the nut, the sleeve and the collar.

6 Claims, 1 Drawing Figure

U.S. Patent
Aug. 22, 1978
4,108,043
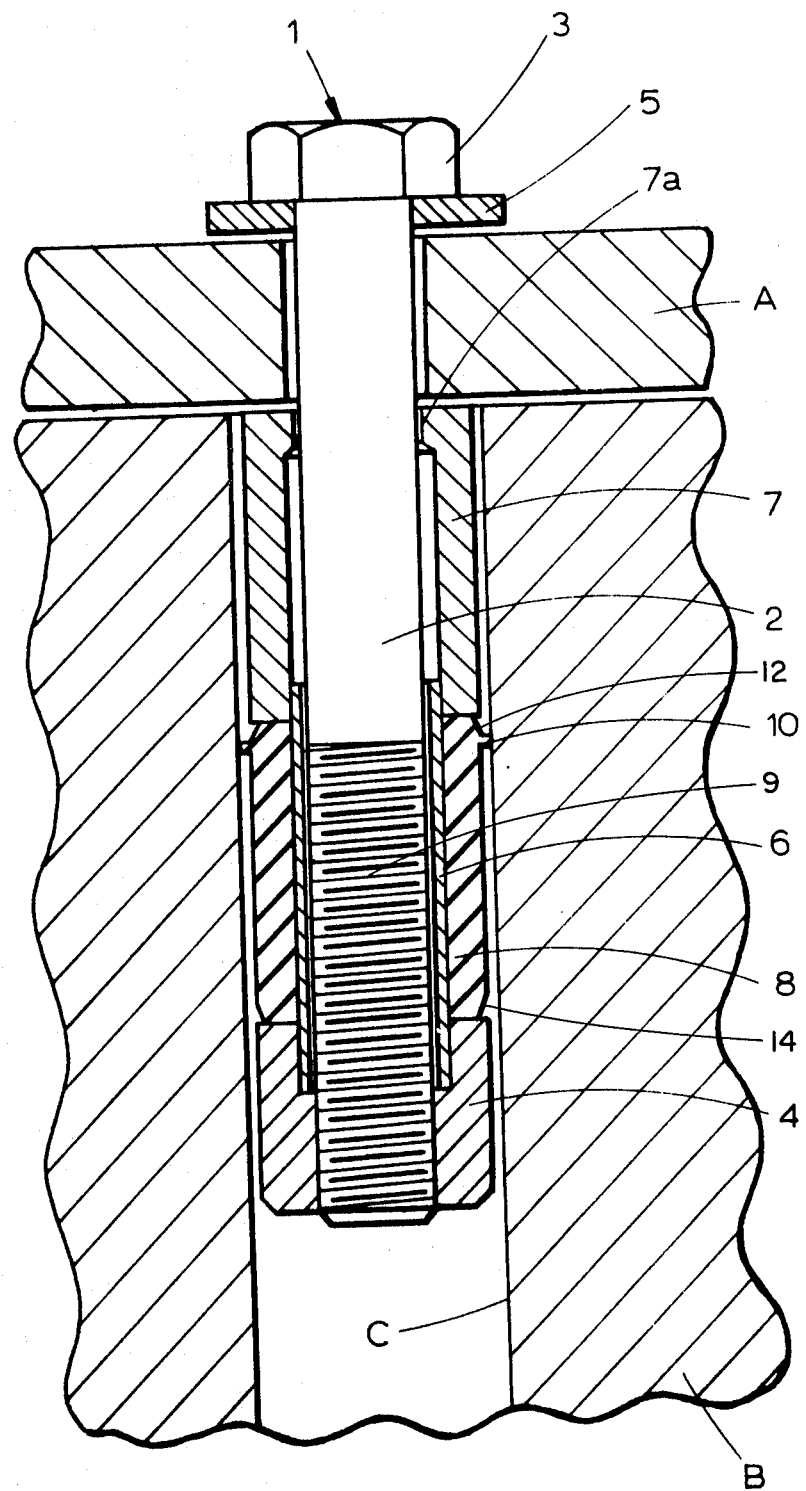

ANCHORAGE APPLIANCE

The present invention is directed towards an improvement in a foundation anchorage appliance of the kind where a hollow cylindrical body of rubber or other elastomeric material is compressed axially so as to produce radial expansion which in turn causes a firm resilient grip in the foundation hole in which the anchorage appliance is set.

A particular form of anchorage appliance of the kind referred to is described in British Patent Specification No. 685,643.

An anchorage appliance of the kind under consideration is generally set into pre-drilled holes into concrete, stone or masonry foundations. In certain methods of installation some elements of the appliance carrying the expanding elastomeric body are placed in the hole loose, with a view to the tightening up operation being carried out after the equipment to be fastened has been placed in position.

This is particularly the case with the type of appliance wherein, permanently associated or integral with a threaded nut is a rigid sleeve carrying the cylindrical elastomeric body, the nut, the sleeve and the elastomeric body being inserted into the hole first and then left to lie at the bottom until the bolt proper can be inserted into it through the fixing hole of the equipment. In an appliance of this kind the expanding elastomeric body is disposed between two axial abutments, one being formed by an annular abutment face on the nut and the other by an annular abutment face on a collar which telescopes over the sleeve and which also enters the foundation hole. The hollow cylindrical elastomeric body is thus fully contained in the foundation hole and indeed the appliance is designed so that the elastomeric body, on expanding, develops its grip as deep in the hole as possible, so as to obtain a reliable engagement with the surrounding foundation.

A common problem encountered by this type of appliance is that frequently the hole may be drilled somewhat oversize and also rather deeper than the length of the bolt to be used. When this occurs the elements carrying the elastomeric body are liable to fall to the bottom of the hole making it difficult or impossible to manipulate the threaded stem of the bolt as to engage the thread of the nut. This can be a serious disadvantage and it requires the foundation hole to be drilled with great care to a specific depth to allow the fixing operation to be carried out. To control the depth of the drilling can be time consuming and awkward and the present specification is directed towards a novel feature of the foundation bolt which effectively overcomes this problem.

Accordingly this invention provides an anchorage appliance comprising a bolt having a head and a threaded stem, a nut on said stem, a metal sleeve permanently associated with the nut and encircling the stem, an annular body of elastomeric material, for example rubber, mounted on the sleeve, a metal collar telescoping over the sleeve, the elastomeric body being subjectible to axial compressive force between annular abutment surfaces on the nut and on the collar when the nut moves up the threaded stem towards the bolt head, the nut, the collar and the elastomeric body when unstressed, together having external cylindrical surfaces of similar diameter except that the elastomeric body is formed integrally with at least one narrow outwardly projecting annular flexible flange.

The elastomeric body except for the flange is generally cylindrical and is chamfered at each end, the or each flange being adjacent to a chamfered end. Preferably there is a single annular flange on that end of the elastomeric body which is remote from the nut and which is adjacent the collar.

Alternatively both ends of the expanding elastomeric body are formed with an integral flexible narrow flange.

The or each flange is dimensioned to have a radial width large enough to engage the bore of a substantially oversized hole with strong enough frictional contact to prevent the elastomeric body and the sleeve on which it is fitted and which supports the entire inner bore of the elastomeric body, to slide with the associated nut to the bottom of the hole. At the same time the flange is formed thin enough to flex upwards when the bolt is pushed into the hole, and possibly also downwards when the bolt is pulled up again especially during the tightening and fixing operation. Thus essentially the flange need in no way interfere with the sound functioning of the anchorage appliance, but it allows the appliance to be positioned securely at a convenient depth in the hole without the danger of parts of the appliance sliding down too deep and out of reach of the bolt proper during the tightening operation.

Preferably the friction flange described above is placed towards that end of the elastomeric sleeve remote from the nut and is adjacent to the base of a chamfer or radius which is generally formed on moulded elastomeric sleeves of the kind described. This position for the flange allows it to flex upwards into the chamfer space when the bolt is pushed down into the hole, but, of course, the rigidity of the flange will be sufficient to hole the weight of the pre-inserted elements themselves in the selected position in the hole, so long as no additional force is applied to them. As already mentioned, the friction flange would be too weak to interfere with the tightening operation and during this operaton the flange may in fact suffer some distortion and tearing. This in no way, however, detracts from the usefulness of this feature which allows the anchorage appliance to be used with greater facility and freedom in a wide range of applications in the engineering, constructing and building industries.

Typical dimensions for the or each friction flange for a rubber sleeve having an outside diameter of 40 mm would be a radial width of 2 mm and thickness of 1½ mm.

The invention will be described by way of example with reference to the accompanying drawing which shows one embodiment of an anchorage appliance.

Referring to the drawing, 1 designates a bolt having a screw threaded stem 2 and a head 3, the part of the stem adjacent the head being surrounded by a washer 5.

4 represents a nut adapted threadedly to engage the threaded part 9 of the stem 2.

6 represents a cylindrical metal sleeve which surrounds the stem 2 and in the embodiment illustrated is press-fitted into an annular recess in the nut 4 so as to be permanently associated with the nut 4. The sleeve 6 may be integral with the nut 4. However, the arrangement illustrated is preferred since it is more economical to manufacture.

Surrounding the cylindrical sleeve 6 and having its internal bore totally supported thereby is a generally cylindrical elastomeric body 8. The anchorage appliance is completed by a collar 7 surrounding the stem 2 and adapted to telescope over the cylindrical sleeve 6 while having a neck portion 7a which closely surrounds the stem 2.

Such an anchorage assembly as above described is intended to secure a component indicated diagrammatically at A to a wall or foundation indicated at B by means of engaging the walls of a preformed hole C in the wall or foundation B.

A usual method of installation would be for the nut 4, the sleeve 6, the elastomeric body 8 and the collar 7 to be introduced together into the preformed hole C. Thereafter the component A would be placed in position and the bolt 1 passed through component A and manipulated to engage the threads of the nut 4. On the bolt 1 then being turned the nut 4 will move along the threads of the stem 2 approaching the bolt head 3. Once clearance between the bolt head 3, washer 5, component A and collar 7 has been taken up, the elastomeric body 8 will then be subjected to axial compression between annular abutment surfaces on the collar 7 and on the nut 4. However the internal bore of the elastomeric body 8 is fully supported by the metal sleeve 6. Accordingly these axial compressive forces deform the elastomeric body 8 and cause it to expand outwardly into engagement with the walls of the preformed hole C.

The anchorage assembly as so far described is typical of appliances which have been used for many years and one difficulty which has arisen with such appliances relates to the necessity of accurately preforming the hole C, both as regards its diameter and depth. If the hole C is made too deep the pre-inserted components of the anchorage appliance tend to move too deeply into the hole thus rendering it difficult or impossible subsequently to manipulate the threads of the bolt stem 2 into engagement with the nut 4.

Accordingly the present invention provides for overcoming this problem by providing on the elastomeric body 8 an integral outwardly projecting flexible narrow flange 10.

As illustrated a single flange 10 is formed on the nut of the elastomeric body 8 which is remote from the end and which is yet adjacent the annular abutment surfaces of the collar 7. As is typical with such elastomeric bodies the body 8 has chamfered ends 12 and 14 and the flange 10 is adjacent end chamfer 12.

The flange 10 is dimensioned to have a radial width large enough to engage the bore of the preformed hole C with sufficient frictional contact to prevent the pre-inserted components from moving too deeply within the hole C prior to engagement of the bolt 1 with the nut 4.

Advantageously the flange 10 will have an overall diameter which is 7 to 15% larger than that of the collar 7, or of the nut 4 or of the elastomeric body 8 when the latter is in unstressed condition, while the depth of the flange will be from 3 to 5% of its overall diameter.

Typically for an elastomeric body 8 having an external diameter of 40 mm, the flange 10 will have a radial width of 2 mm and a depth of 1½ mm.

I claim:

1. An anchorage appliance comprising a bolt having a head and a threaded stem, a nut on said stem, a metal sleeve permanently associated with the nut and encircling the stem, a cylindrical annular body of elastomeric material, for example rubber, mounted on the sleeve and having one end thereof abutting the nut, a metal collar telescoping over the sleeve, the elastomeric body being subjectible to axial compressive force between annular abutment surfaces on the nut and on the collar when the nut moves up the threaded stem towards the bolt head, the nut, the collar and the elastomeric body when unstressed together having external cylindrical surfaces of similar diameter, a narrow outwardly projecting annular flexible flange on the elastomeric body adjacent the other end of the cylindrical annular body, the flange having an overall diameter which is 7 to 15% larger than that of the collar, the nut and the elastomeric sleeve when the latter is in unstressed condition.

2. An appliance according to claim 1, wherein the elastomeric body is chamfered at each end.

3. An anchorage appliance comprising a bolt having a head and a threaded stem, a nut on said stem, a metal sleeve permanently associated with the nut and encircling the stem, an annular body of elastomeric material, for example rubber, mounted on the sleeve, a metal collar telescoping over the sleeve, the elastomeric body being subjectible to axial compressive force between annular abutment surfaces on the nut and on the collar when the nut moves up the threaded stem towards the bolt head, the nut, the collar and the elastomeric body when unstressed together having external cylindrical surfaces of similar diameter, a single narrow outwardly projecting annular flexible flange on the elastomeric body, the flange being integral with the body and having an overall diameter which is 7 to 15% larger than that of the collar, the nut and the elastomeric sleeve when the latter is in unstressed condition and the flange having a depth axially of the appliance which is from 3% to 5% of its overall diameter, the single annular flange being located on that part of the elastomeric body which is remote from the nut and which is adjacent the collar, the flange being adjacent a chamfered end region of the elastomeric body so that the flange can deform into a recess defined in part by the chamfer.

4. An appliance according to claim 3, wherein the sleeve supporting the internal bore of the elastomeric body and the nut are integral with one another.

5. An appliance according to claim 1, wherein the flange has a depth, axially of the appliance, which is from 3 to 5% of its overall diameter.

6. An appliance according to claim 1, wherein the sleeve supporting the internal bore of the elastomeric body and the nut are integral with one another.

* * * * *